(12) United States Patent
Holmes et al.

(10) Patent No.: US 7,337,142 B1
(45) Date of Patent: Feb. 26, 2008

(54) MULTIPLE EXCHANGE RATE TRACKING IN A FINANCIAL TRANSACTION MANAGER

(75) Inventors: Andrew D. Holmes, Edmonton (CA); Lee Horigan, Toronto (CA); Jeffrey A. Langston, Palo Alto, CA (US); David McMurtry, Los Altos, CA (US); Sylvain Tremblay, Beaumont (CA); Raymond P. Trounday, Daly City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/428,284

(22) Filed: Oct. 27, 1999

(51) Int. Cl.
*G06Q 40/00* (2006.01)

(52) U.S. Cl. .................. 705/39; 705/35; 705/36; 705/37; 705/38; 705/39; 705/40

(58) Field of Classification Search .......... 705/35–42
See application file for complete search history.

(56) References Cited

U.S. PATENT DOCUMENTS

| | | | | |
|---|---|---|---|---|
| 5,761,386 | A * | 6/1998 | Lawrence et al. | 395/23 |
| 5,884,274 | A * | 3/1999 | Walker et al. | 705/4 |
| 5,963,923 | A * | 10/1999 | Garber | 705/37 |
| 5,969,974 | A * | 10/1999 | Vandenbelt et al. | 708/105 |
| 6,018,721 | A * | 1/2000 | Aziz et al. | 705/35 |
| 6,029,146 | A * | 2/2000 | Hawkins et al. | 705/35 |
| 6,058,375 | A * | 5/2000 | Park | 705/30 |
| 6,065,673 | A * | 5/2000 | Kokkila | 235/379 |
| 6,199,046 | B1 * | 3/2001 | Heinzle et al. | 705/1 |
| 6,205,433 | B1 * | 3/2001 | Boesch et al. | 705/26 |
| 2001/0011241 | A1 * | 8/2001 | Nemzow | 705/35 |

OTHER PUBLICATIONS

"Pacific Exchange Rate Service Retrieval Interface", http://pacific.commerce.ubc.ca/xr/data.html, Nov. 25, 1996.*
"Oanda Currency converter", http://www.oanda.com/, Dec. 10, 1997.*
"Quicken, Getting More from Your Money," Intuit Canada Limited, Q97WB3011MLC, pp. 1-106, © 1997.
"Strategies for Success, Eleven Ways to Use Money Effectively," Microsoft Corporation, The Canadian Money 99 Campanion, Document No. X03-72396, pp. 1-92, © 1991-1998.
Strategies for Success, 10 Ways to Use Money Effectively, Microsoft Corporation, The Canadian Money 2000 Companion, Document No. X04-88924, pp. 1-105, © 1999.
Comprehensive Multi-Currency Portfolio Management [online]. May 8, 1999. Captools Company [retrieved on Feb. 21, 2003]. 2 Pages. Retrieved from the Internet: <URL: http://web.archive.org/web/20030221164955/http://captools.com/multi-currency.html>.

(Continued)

*Primary Examiner*—Bradley B. Bayat
*Assistant Examiner*—Timothy M Harbeck
(74) *Attorney, Agent, or Firm*—Osha Liang LLP

(57) ABSTRACT

A system, method, computer program product, and user interface for tracking multiple exchange rates for transactions in a financial software application. Historical exchange rates are applied to transactions involving currency conversions, and accurate reports are generated by retrieving appropriate historical rates according to the dates of the transactions. Exchange rates are stored by associating them with individual transactions or with date ranges. Generated reports accurately reflect historical exchange rate information where applicable.

51 Claims, 15 Drawing Sheets

OTHER PUBLICATIONS

OANDA.com, The Currency Site, "About OANDA", www.oanda.com/site/oanda/com_index.shtml, Jan. 1, 1996, 2 pages.

MS Money On-Screen Help Printouts, Microsoft Money 99, Microsoft Corporation.

"Quicken, Getting More from Your Money," Intuit Canada Limited, Q97WB3011MLC, pp. 1-106, © 1997.

"Strategies for Success, Eleven Ways to Use Money Effectively," Microsoft Corporation, The Candain Money 99 Campanion, Document No. X03-72396, pp. 1-92, © 1991-1998.

Strategies for Success, 10 Ways to Use Money Effectively, Microsoft Corporation, The Canadian Money 2000 Companion, Document No. X04-88924, pp. 1-105, © 1999.

* cited by examiner

Customize Capital Gains Report — 1500

Display | Accounts | Include | Advanced

Report Dates:
Year to date   from: 1/1/99   to: 6/15/99

Report Layout:
Title: Capital Gains Report

Headings:
Subtotal By: Security

Show:
☑ Cents in Amounts

Show Columns:
Column
» Acct
» Security
» Shares
» Bought
» Sold
» Sales Price
» Cost Basis Reset Cols 1501 — Currency: Canadian Dollar
1502 — ☐ Transaction Exchange Rate ✓ Create   ✗ Cancel   ? Help

FIG. 15

MULTIPLE EXCHANGE RATE TRACKING IN A FINANCIAL TRANSACTION MANAGER

BACKGROUND OF THE INVENTION

1. Field of the Invention

The present invention relates generally to software for tracking financial transactions, and more particularly to a system, method, and computer program product for tracking multiple exchange rates for various transactions occurring over a period of time.

2. Description of Background Art

Software products for tracking financial transactions are generally capable of converting from one currency to another using a stored exchange rate. When exchange rates change, the stored value can be updated. However, transactions affected by the change are often not adjusted correctly, since the most current exchange rate may not be appropriate for calculations involving past transactions.

Conventional financial software is able to store exchange rates for a number of currencies. One currency is designated a "home currency," and exchange rates for all other currencies are expressed in terms of multipliers with respect to the home currency. Typically, the home currency corresponds to the country in which the user resides or primarily conducts business. Thus, if the home currency is the Canadian dollar, exchange rates for other currencies (such as the British pound, the U.S. dollar, and the like) would be expressed in terms relative to the Canadian dollar.

In conventional systems, the stored exchange rate for a particular currency is used to calculate equivalent values for any transactions involving that currency. Thus, if an exchange rate of 1.5 is stored for the U.S. dollar with respect to the Canadian dollar, and the home currency is the Canadian dollar, all transactions involving U.S. currency would be multiplied by 1.5 to obtain the equivalent in Canadian funds. If the exchange rate subsequently changes to 1.4, all transactions (past and present) are automatically updated to reflect the new exchange rate.

This approach—updating past transactions using current exchange rates—is adequate for certain types of reports that represent "snapshots" in time, such as a Net Worth report or an Account Balance report. However, inaccuracies may result when such an approach is applied to other types of reports, particularly investment tracking such as Capital Gains and Portfolio Value reports. The above-described conventional technique is unable to easily generate accurate data for such reports, since such a technique lacks the ability to store different exchange rates for different dates, for example when the exchange rate has changed between the buy and sell dates for a security. Thus, such a technique would not be able to track, for example, capital gains/losses involving foreign currencies, in an effective and accurate manner.

Furthermore, it is desirable to represent foreign currency transactions in a manner that achieves consistency with accounting treatments for domestic transactions. As domestic transactions are recorded in the domestic currency, foreign transactions should ideally be recorded in the domestic currency as well. Conversion to domestic currency should take place using the exchange rate in effect at the date of the transaction. In conventional systems, subsequent changes to exchange rates can lead to inaccurate results, because the exchange rate being used for the conversion is no longer equal to the exchange rate in effect on the date of the transaction.

One example of such a situation is the calculation of capital gains. Calculation of capital gains on foreign assets ideally should be performed by multiplying foreign prices by the exchange rates on the date of the transactions. Thus, when a user records a purchase or sale of foreign stocks, the transaction must be converted to the domestic currency using the exchange rate in effect on that day. If, for example, a Canadian user records the purchase and subsequent sale of stock in U.S. currency, correct calculation of capital gains would yield the following results:

| Transaction | Foreign Currency | Exchange | Home Currency |
|---|---|---|---|
| Purchase 1 share at | $30.00 US | 1.2 | $36.00 CAD |
| Sell 1 share at | $50.00 US | 1.5 | $75.00 CAD |
| Capital gain | | | $39.00 CAD |

The differing exchange rates for the two transactions occur because the purchase and sale occurred on different dates. However, conventional systems would fail to take into account the historical exchange rate information, and would incorrectly calculate the capital gain as $30.00 CAD, based on a current exchange rate of 1.5 ($50×1.5-$30×1.5).

Similar inaccuracies can arise in other situations. For example, foreign monetary items (such as accounts payable, accounts receivable, cash, and the like) must be adjusted to reflect the exchange rates in effect at the financial statement date. If historical exchange rate information is not readily available, such items may be inaccurately converted to the home currency using a single exchange rate. Such issues often arise in many other contexts as well.

What is needed is a system, method, and computer program product for tracking multiple exchange rates for each currency, and for storing exchange rate information for each of a number of transactions involving currency conversions. What is further needed is a system, method, and computer program product for storing and maintaining historical exchange rates and applying such rates to transactions occurring on various dates. What is further needed is a user interface for accessing, storing, and maintaining such historical exchange rates for a plurality of currencies. What is further needed is a system, method, and computer program product for generating a financial report including at least two transactions using at least two historical exchange rates.

SUMMARY OF THE INVENTION

In accordance with the present invention, there is provided a system and method for tracking multiple exchange rates for a particular currency, or for a plurality of currencies. Each of the exchange rates represents the value of the currency at a particular time and/or date. Thus, the present invention is able to track exchange rates for individual investment transactions in foreign currencies, based on the transaction dates. This facilitates the generation of transaction reports that accurately display amounts in the home currency. Capital Gains reports, Portfolio Value reports, and the like can reflect values in the home currency using exchange rate values corresponding to the actual dates of the transactions in question.

In accordance with one embodiment, there is also provided a user interface for entering and maintaining historical and time-based exchange rates, as well as a mechanism for obtaining such information in an automated fashion, either from stored data files or from a central resource such as an Internet site.

BRIEF DESCRIPTION OF THE DRAWINGS

FIG. 15 is a diagram of an example of a Customize Capital Gains Report screen according to one embodiment of the present invention.

DETAILED DESCRIPTION OF THE PREFERRED EMBODIMENTS

For illustrative purposes, the following description of preferred embodiments discusses the invention in terms of a personal accounting software package, such as Quicken® from Intuit Corporation, which is commonly used for tracking financial transactions. As described below, the present invention can be implemented as extended functionality or as an upgrade to such software packages. However, the present invention is not limited to such implementations, and therefore the descriptions provided herein are intended to be illustrative, but not limiting, of the scope of the invention.

The present invention may be implemented, for example, on a conventional personal computer as is known in the art, including a microprocessor such as the Pentium® processor from Intel® Corporation, memory, a storage device such as a hard drive, a display device such as a monitor, and an input device such as a keyboard and/or mouse. The computer may run a conventional operating system such as Microsoft® Windows 98, from Microsoft Corporation, under which the software embodying the present invention may run. Other configurations, hardware architectures, or operating systems may also be used, as will be understood by one skilled in the art.

In the following description of the operation of the invention, the terms "screen", "window", "dialog box", "pane", and the like may be used interchangeably to refer to a visual user interface component for display to the user and/or for accepting input from the user. All such terms should be considered equivalent, with no limitation to be inferred from use of one particular term in the context of the following description and claims.

The present invention improves upon conventional financial transaction software by tracking multiple exchange rates for various transactions occurring over a period of time. To accomplish this, the present invention maintains historical information regarding exchange rates for transactions. In one embodiment, a currency list is maintained, containing periodic (such as daily) exchange rates for each relevant currency. For each account, a currency is designated and the registers for the account are maintained in that currency. An account list may be stored or generated, showing account balances in designated currencies, and a total in the user's home currency. Various reports may also be generated, such as net worth and portfolio value reports, converting foreign currencies using the latest exchange rate available, as retrieved from the currency list. Transaction reports may also be generated, showing equivalent home currency values using the stored historical information appropriate for the transaction date. In one embodiment, exchange rates are saved for each individual investment transaction, so that such historical information is readily available.

Figure 1:
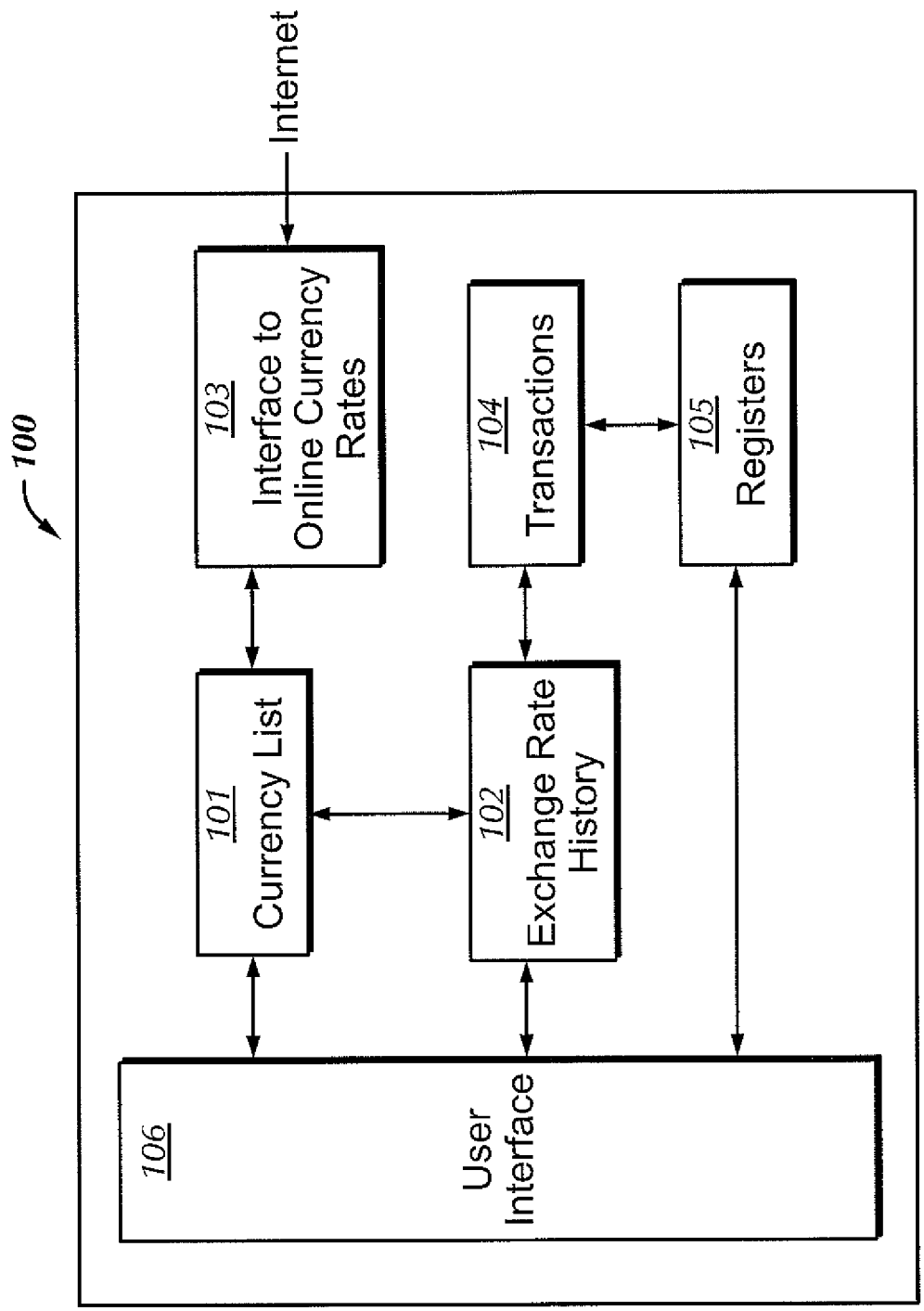
FIG. 1 is a functional block diagram of an embodiment of the present invention.

Referring now to FIG. 1, there is shown a functional block diagram of an embodiment of the present invention. Currency list 101 stores information describing the current exchange rate for various currencies. Exchange rate history 102 stores historical information for exchange rates, including the rate for each relevant currency at various dates (for example, on a daily basis if appropriate). Exchange rates for intermediate dates (for which there is no record in history 102) can be considered equal to the latest available exchange rate preceding the intermediate date, so that a particular exchange rate remains in effect until the date indicated for the next exchange rate. In one embodiment, currency list 101 is generated from history 102, rather than stored separately. Interface to online currency rates 103 is an electronic connection to some source of exchange rate information; interface 103 may be implemented, for example, as a connection via the Internet. In one embodiment, the system includes preloaded historical exchange rate information 102 for some period of time, such as five years.

Transactions 104 is a list of transactions stored, for example, in a database, as is known in the art. For each transaction, information such as date, description, amount, category, and the like, is stored. Users can manipulate transactions 104 via user interface components such as, for example, registers 105, which provide input/output capability for interacting with transactions 104 in a manner that is known for personal finance software. User interface (UI) 106 provides a vehicle by which the user can view and change information in system 100, and is implemented in one embodiment by a series of windows and screens, as will be described in more detail below.

In the present invention, transactions 104 and registers 105 are adapted as described below to enable storage, tracking, and manipulation of historical exchange rates associated with particular transactions. In addition, other user interface components are introduced and/or improved over the prior art, in order to provide functionality for implementing the present invention.

Figure 2:
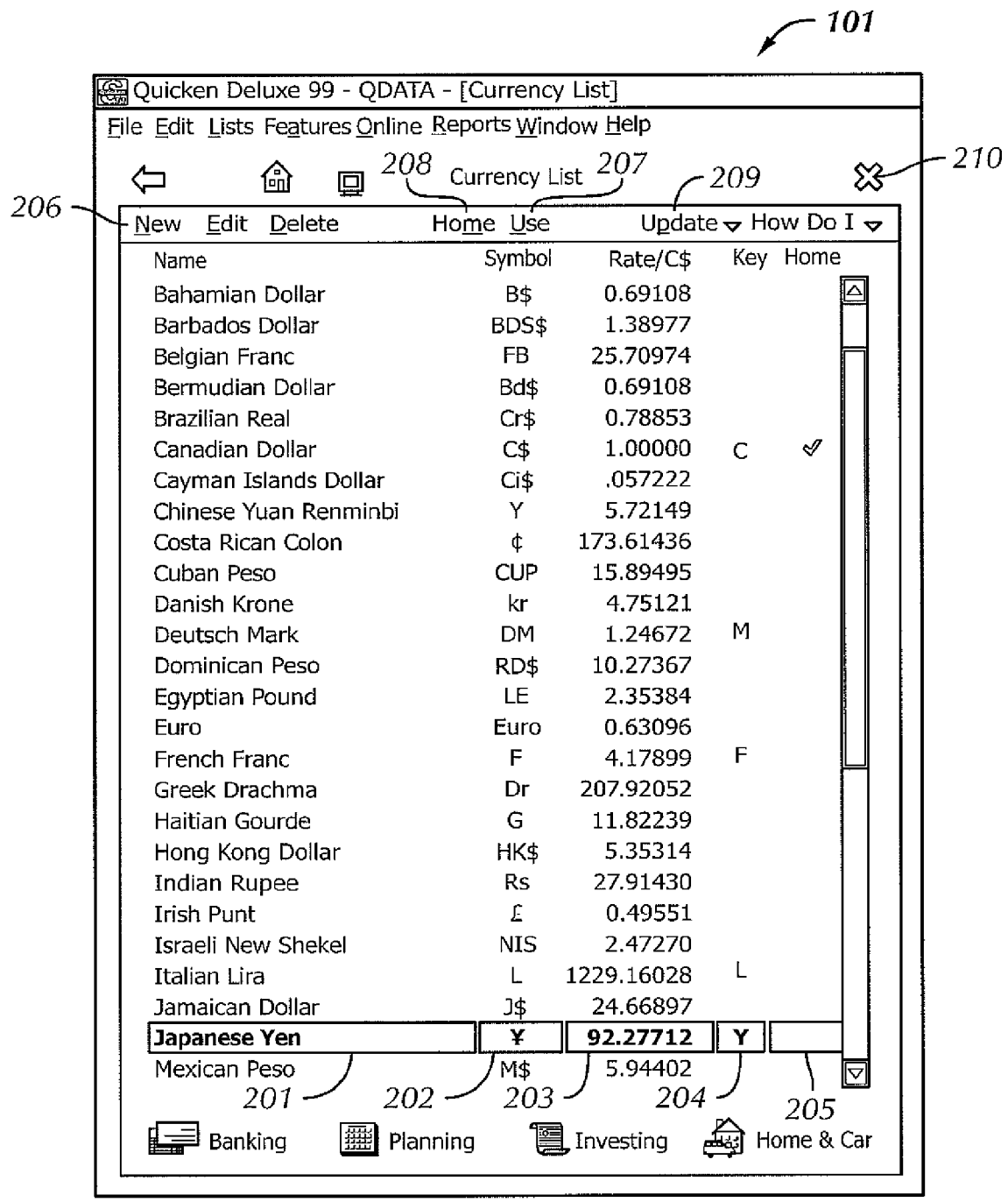
FIG. 2 is a diagram of an example of a currency list according to one embodiment of the present invention.

Referring now to FIG. 2, there is shown a screen, as displayed by user interface 106, for user access to currency list 101 according to one embodiment of the present invention. Currency list 101 displays the current exchange rate for a number of currencies. In one embodiment, the current exchange rate is obtained by consulting the most recent exchange rate stored in exchange rate history 102.

For each of a number of currencies, currency list 101 displays name 201, symbol 202, rate 203, keyboard shortcut key 204 (for enabling quick selection of the corresponding currency), and an indication 205 of whether the currency is the "home" currency. Buttons 206 allow the user to add, edit, or delete currency information. Use button 207 allows the user to select a particular currency to be used. Home button 208 allows the user to designate a currency as the home currency. Update rates button 209 activates a connection to an external source of exchange rate data and automatically updates the stored rates accordingly. In one embodiment, button 209 includes a drop down menu containing two options: Get Online Currency Rates, and Edit Exchange Rate History (for allowing manual update of the history). Close button 210 closes the window.

Figure 3:
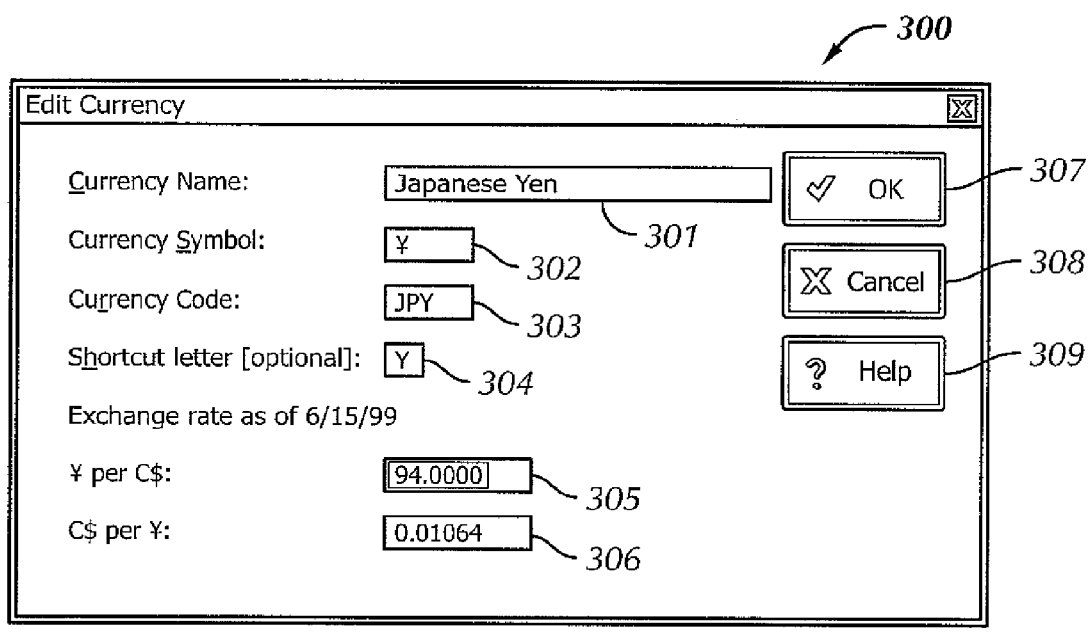
FIG. 3 is a diagram of an example of an Edit Currency screen according to one embodiment of the present invention.

The user can add currencies to list 101 as needed, by clicking on the New button. Currency information is edited by selecting a currency and clicking the Edit button. Referring now to FIG. 3, there is shown an Edit Currency screen 300, as displayed by user interface 106, according to one embodiment of the present invention, for use in adding or editing currency and exchange rate information. The user can enter or edit information in name field 301, symbol field 302, currency code field 303, keyboard shortcut letter field 304, and exchange rate fields 305 and 306 (for entering the exchange rate as of the current date, relative to the home currency). In one embodiment, only one of fields 305 and 306 need be filled in by the user, and the other field is automatically filled in with the reciprocal of the entered value. The user clicks OK button 307 to confirm the changes, or Cancel 308 to cancel them. Help button 309 activates a help feature (not shown).

Figure 4:
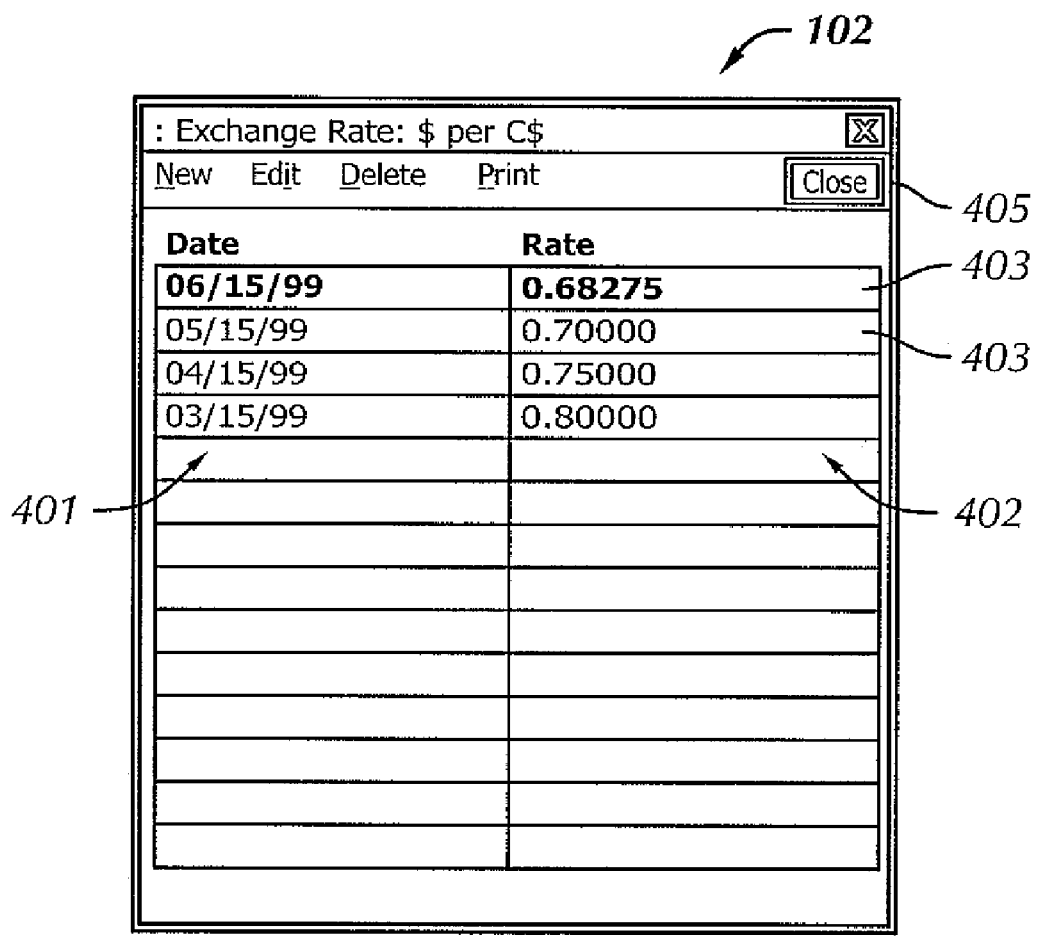
FIG. 4 is a diagram of an example of an Exchange Rate History screen according to one embodiment of the present invention.

Referring now to FIG. 4, there is shown a screen, as displayed by user interface 106, for editing exchange rate history 102 according to one embodiment. The screen shown provides a user interface to the data stored in history 102 for any selected currency in currency list 101. Buttons 405 allow the user to add new exchange information by adding a row to history 102, or to edit information, delete information, print the table, or close the screen. For any number of dates 401, the screen displays the corresponding exchange rate 402 (shown relative to the home currency) as stored in history 102. Each row 403 in the screen corresponds to a record in history 102, so that any number of records can be maintained. In history 102, separate tables for each currency may be maintained, or in an alternative embodiment all such information may be stored in a single table. In this way, the system of the present invention is able to track historical exchange rate information. System 100 can obtain the exchange rate for a particular transaction by consulting the appropriate table for the currency being used, and looking up the exchange rate in effect as of the transaction date. As described above, if no rate is available for the date of the transaction, system 100 can use the latest available exchange rate preceding the transaction date, so that a particular exchange rate remains in effect until the date indicated for the next exchange rate. Alternatively, a date range or other time period can be explicitly specified for each exchange rate.

In one embodiment, history 102 is automatically updated using exchange rate information obtained from an external source, such as over the Internet. Such functionality is implemented by periodically contacting the external source and retrieving the relevant information. Such operations may be performed at predetermined times, or in response to manual activation by the user. Records are then added to history 102 to store the retrieved information.

Figure 5:
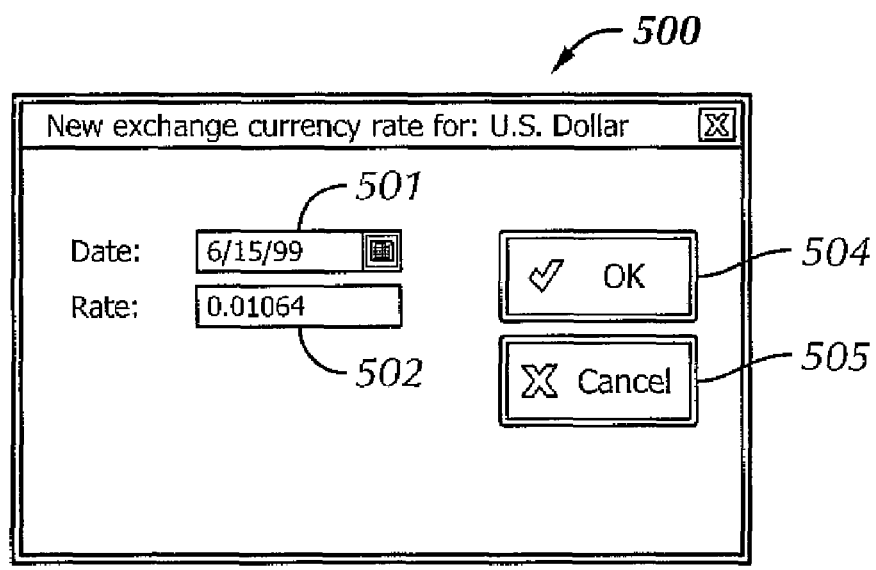
FIG. 5 is a diagram of an example of a New/Edit Exchange Rate screen according to one embodiment of the present invention.

The user can also manually enter information into history 102. Referring now to FIG. 5, there is shown a New/Edit Exchange Rate screen, as displayed by user interface 106 according to one embodiment. This screen is used for adding a new record to history 102, or for editing an existing record. The user enters information in date field 501 and in exchange rate field 502. In one embodiment, screen 500 contains two fields (not shown) for exchange rate, one representing the reciprocal of the other. When the user fills in one of the fields (e.g. for Canadian dollars per U.S. dollar) the other field is automatically filled in with the reciprocal of the entered value (e.g. U.S. dollars per Canadian dollar). OK button 504 confirms the change, and Cancel button 505 cancels it. In an alternative embodiment, the user is able to edit, add, or delete exchange rate information for particular dates directly in the fields shown in FIG. 4.

Figure 6:
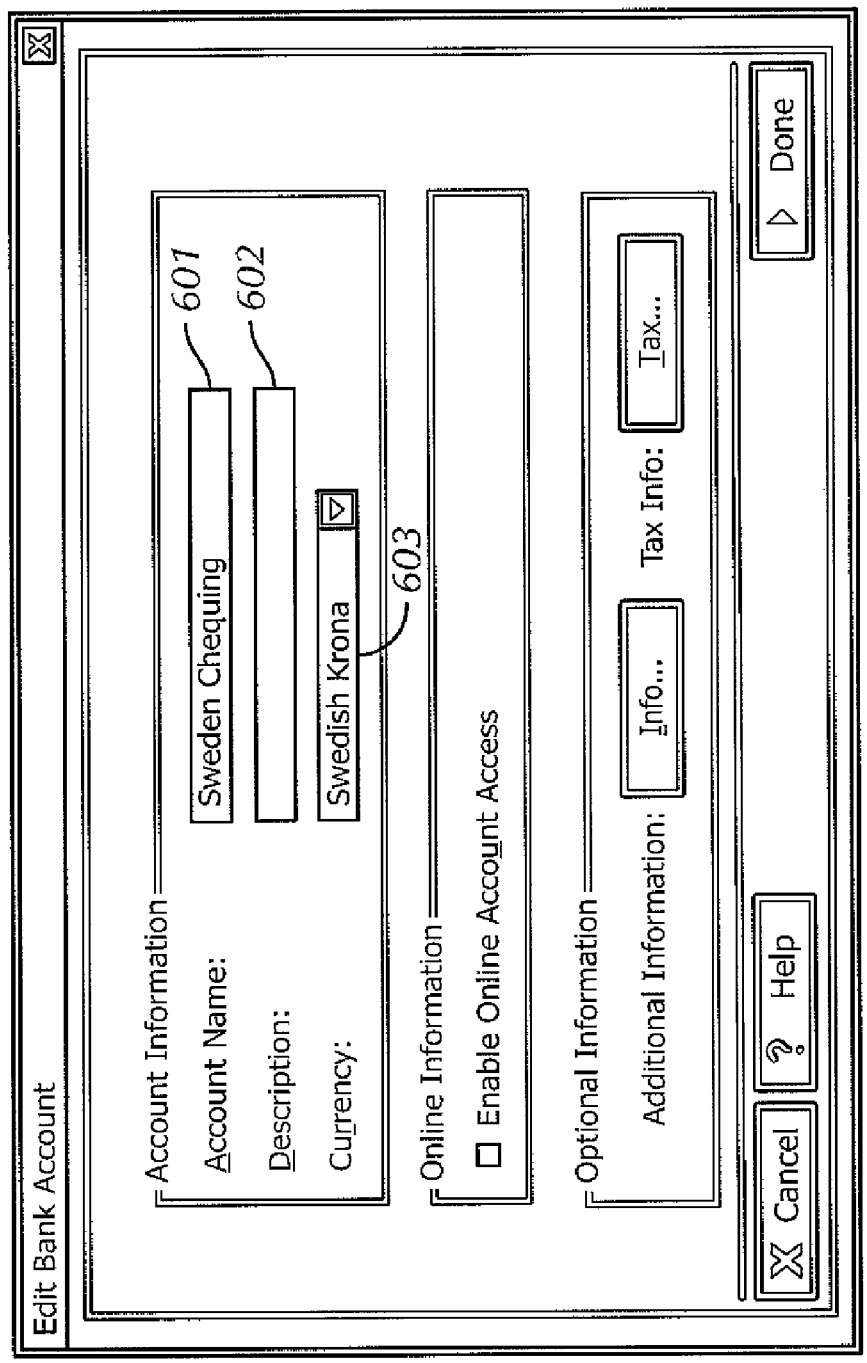
FIG. 6 is a diagram of an example of an Edit Bank Account screen according to one embodiment of the present invention.

As is known in the art, software for personal finances typically allows a user to set up one or more accounts corresponding to bank accounts, credit card accounts, investment accounts, and the like. In the present invention, each such account is associated with a particular currency. The user can specify the currency for an account when the account is created, and can modify the selection later. Referring now to FIG. 6, there is shown an Edit Bank Account screen 600, as displayed by user interface 106, for specifying or changing account information, including the account name 601, description 602, and currency 603. In one embodiment, currency field 603 is a pull-down menu that allows the user to select any currency from currency list 101. Once a currency has been selected using screen 600, the system tracks transactions for the account using the designated currency. Summary reports requiring conversion to other currencies can then be generated using the appropriate calculation with historical exchange rates for the designated currency.

Figure 7:
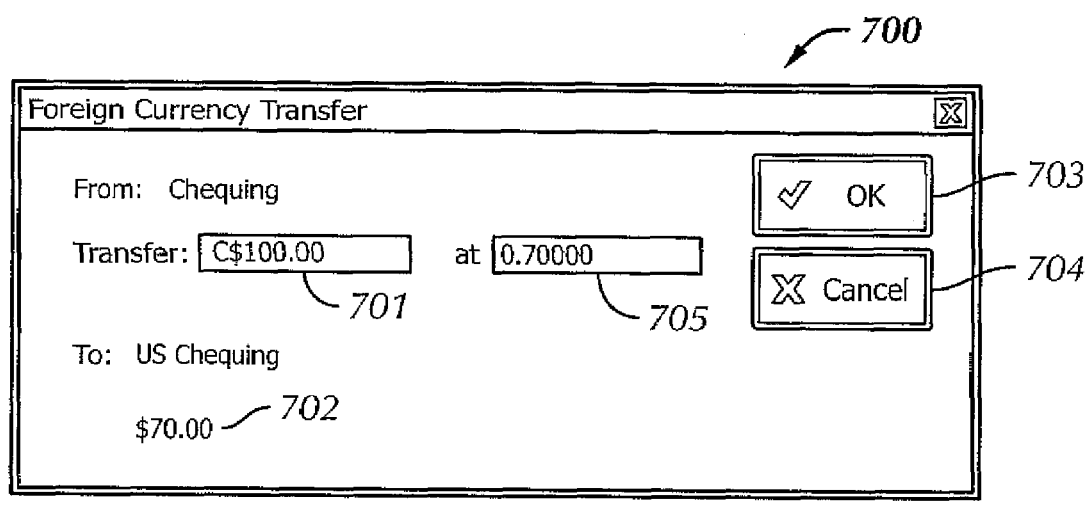
FIG. 7 is a diagram of an example of a Foreign Currency Transfer screen according to one embodiment of the present invention.

In one embodiment, the present invention converts currencies when recording a transfer between accounts, using historical exchange rate information appropriate to the date of the transfer. Referring now to FIG. 7, there is shown a Foreign Currency Transfer screen 700, as displayed by user interface 106, for displaying conversion information for such a transfer. In the example shown, an amount 701 in foreign currency is being transferred to an account of a different currency. Converted amount 702 is determined by the system using historical exchange rate information from exchange rate history 102. In one embodiment, the system retrieves the appropriate exchange rate 705 for the date of the transfer, so that correct conversion can take place even if the transfer is being recorded much later than its effective date. The user can also manually override the information in field 702 by typing a different value, if desired in field 705. OK button 703 confirms the transfer, and Cancel button 704 cancels it.

Figure 8:
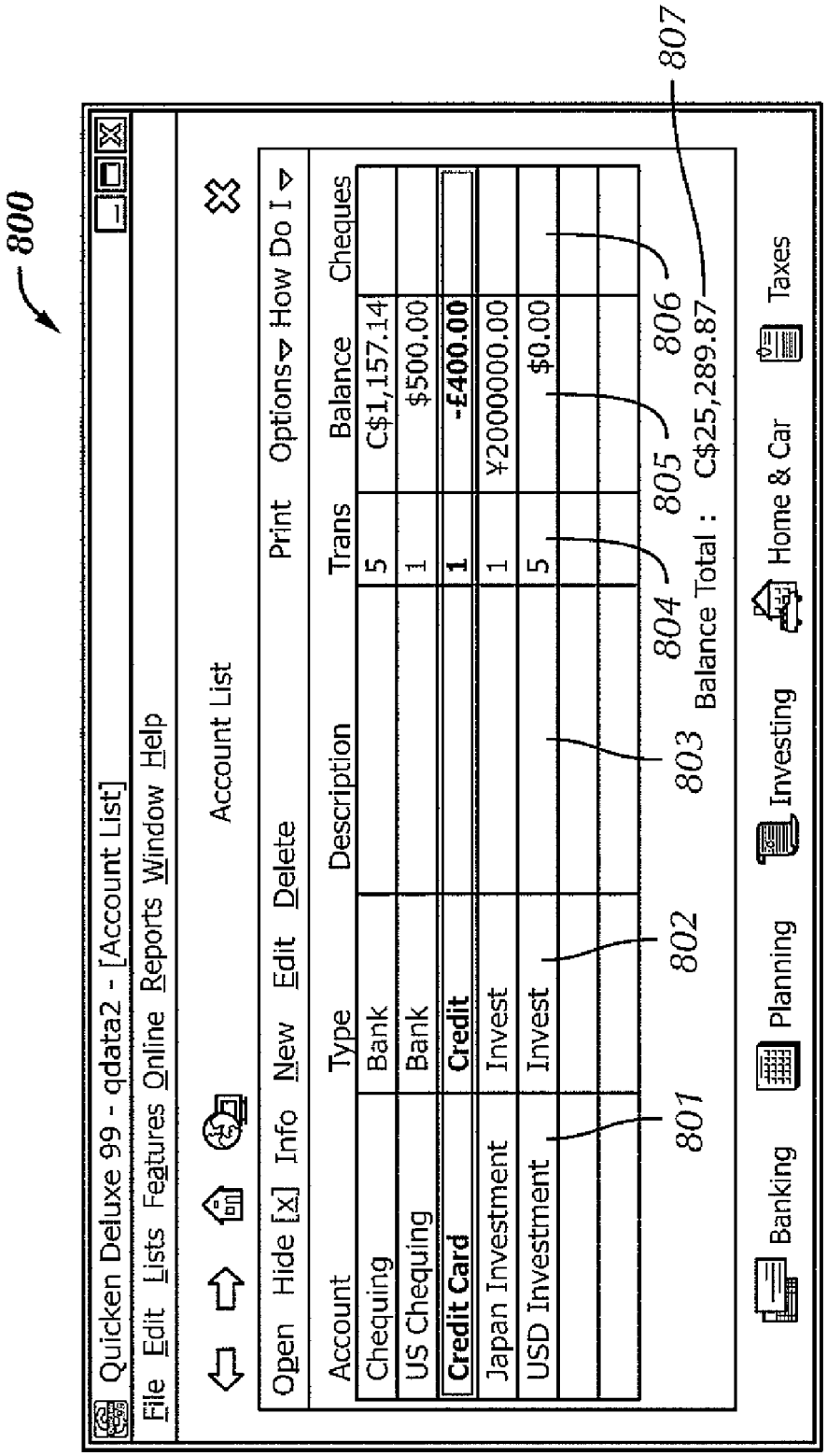
FIG. 8 is a diagram of an example of an Account List screen according to one embodiment of the present invention.

Referring now to FIG. 8, there is shown an Account List 800, as displayed by user interface 106 according to one embodiment of the present invention. Account List 800 shows, for each account belonging to the user, a name 801, type 802, description 803, number of transactions 804, balance 805 and cheques column 806 indicating whether the account has cheques to be printed. Balance 805 for each account is shown in the currency for that account. In an alternative embodiment, balance 805 is shown in the user's home currency (converted according to the current exchange rate), or balance 805 may be shown in both the account currency and the home currency. Other fields may also be included, such as the currency code for the account. Balance total 807, representing the total amount for all accounts, is shown in the user's home currency (converted according to the current exchange rate).

Figure 9:
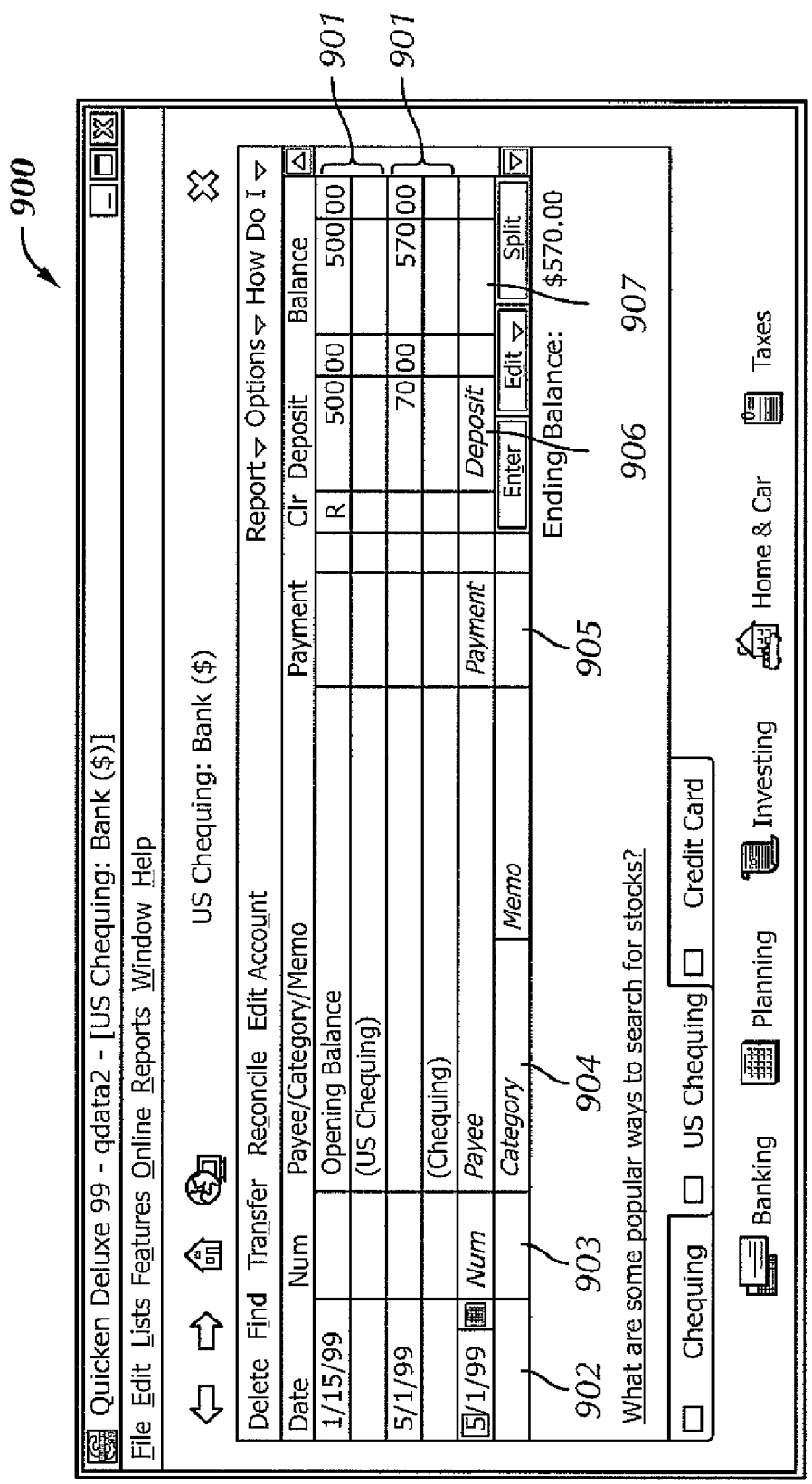
FIG. 9 is a diagram of an example of a General Register screen according to one embodiment of the present invention.

Referring now to FIG. 9, there is shown an example of a Register screen 900, as displayed by user interface 106 according to one embodiment of the present invention. As is known in the art, a register is an on-screen display of transactions pertaining to a particular account, as identified by title 909. For each transaction 901 a date 902, reference number 903, descriptive information 904, type 905, amount 906, and balance 907 are shown. The user may view, enter, or edit particulars of transactions, as desired. In one embodiment of the present invention, register 900 is displayed in the currency of the account being shown. In an alternative embodiment, the currency symbol can be displayed at the top of the register screen. In another alternative embodiment, balances 907 (including the ending balance) can optionally be converted to the user's home currency.

Figure 10:
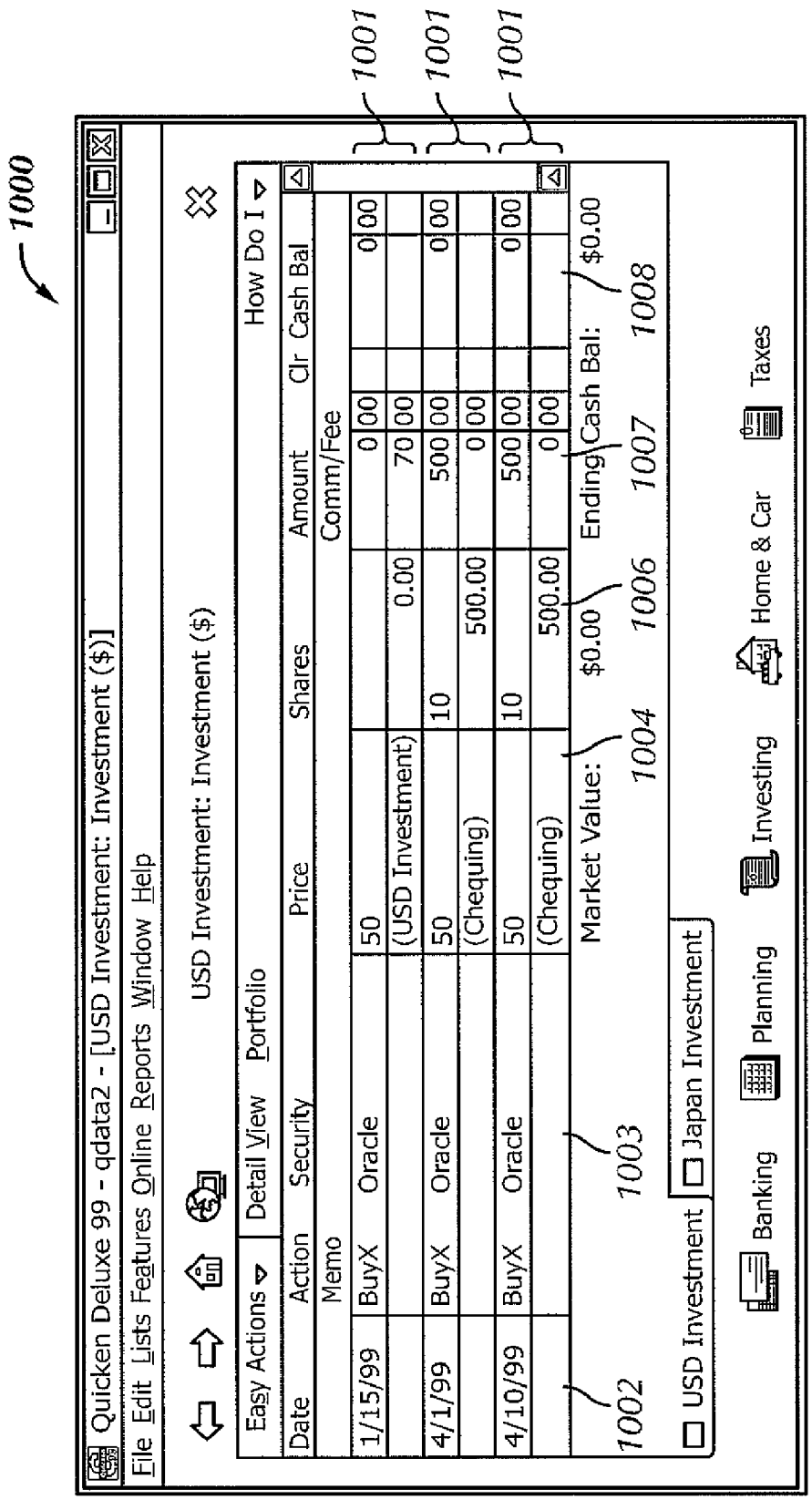
FIG. 10 is a diagram of an example of an Investment Register screen according to one embodiment of the present invention.

Referring now to FIG. 10, there is shown an example of an Investment Register screen 1000, as displayed by user interface 106 according to one embodiment of the present invention. As is known in the art, an Investment Register is an on-screen display of transactions pertaining to investments. For each transaction 1001 a date 1002, descriptive information 1003, price per unit 1004, number of units (e.g. shares) 1006, amount and commission/fee 1007, and cash balance 1008 are shown. In one embodiment, for each transaction involving a conversion from one currency to another, the exchange rate for the currency as of the date of the investment transaction is stored. The exchange rate is retrieved using historical exchange rate information from exchange rate history 102. Thus, even if exchange rates have changed over time, the correct exchange rate for the date of the transaction can be applied when converting currencies. Alternatively, the user may manually enter the exchange rate and/or override retrieved values. When entering a transaction, the user is presented with a dialog box, as shown in FIG. 7, presenting the prevailing exchange rate (obtained from exchange rate history 102) and allowing the user to override it, if desired. The entered rate is stored along with the transaction. If the user overrides the exchange rate listed, and history 102 does not have a rate for the date of the transaction, in one embodiment the system automatically enters a new exchange rate in history 102 for the corresponding date.

The present invention tracks an exchange rate for each foreign currency investment transaction. In one embodiment, the exchange rate is stored along with the other information in the transaction record. In another embodiment, the exchange rate is not stored in the transaction record, but is retrieved from history 102 when needed to perform a calculation or to display transaction information. Thus, the system is able to maintain a different exchange rate for every transaction, if required.

In an alternative embodiment, if the exchange rate is stored in the transaction record, such information can be updated automatically whenever historical exchange rate information in history 102 is changed. Thus, for example, if an exchange rate for a particular date is changed after the fact, the system can automatically update all transactions affected by the change. This is done by searching the various transaction records for transactions involving the currency and occurring on the date of the change (or soon thereafter), and entering the new exchange rate information in the affected transaction records.

In one embodiment, all accounts employ historical exchange rate information when tracking transactions involving foreign currencies. In another embodiment, only selected accounts employ historical exchange rates, while other accounts use a global exchange rate in a conventional manner. For example, investment accounts may use historical exchange rates, while bank accounts and credit card accounts may use global (non-historical) exchange rates in a conventional manner. In some situations, such a scheme may be advantageous, since the use of a global exchange rate may be simpler and more appropriate for certain types of accounts.

In yet another embodiment, all transactions within a particular investment account are associated with a particular currency.

Figure 11:
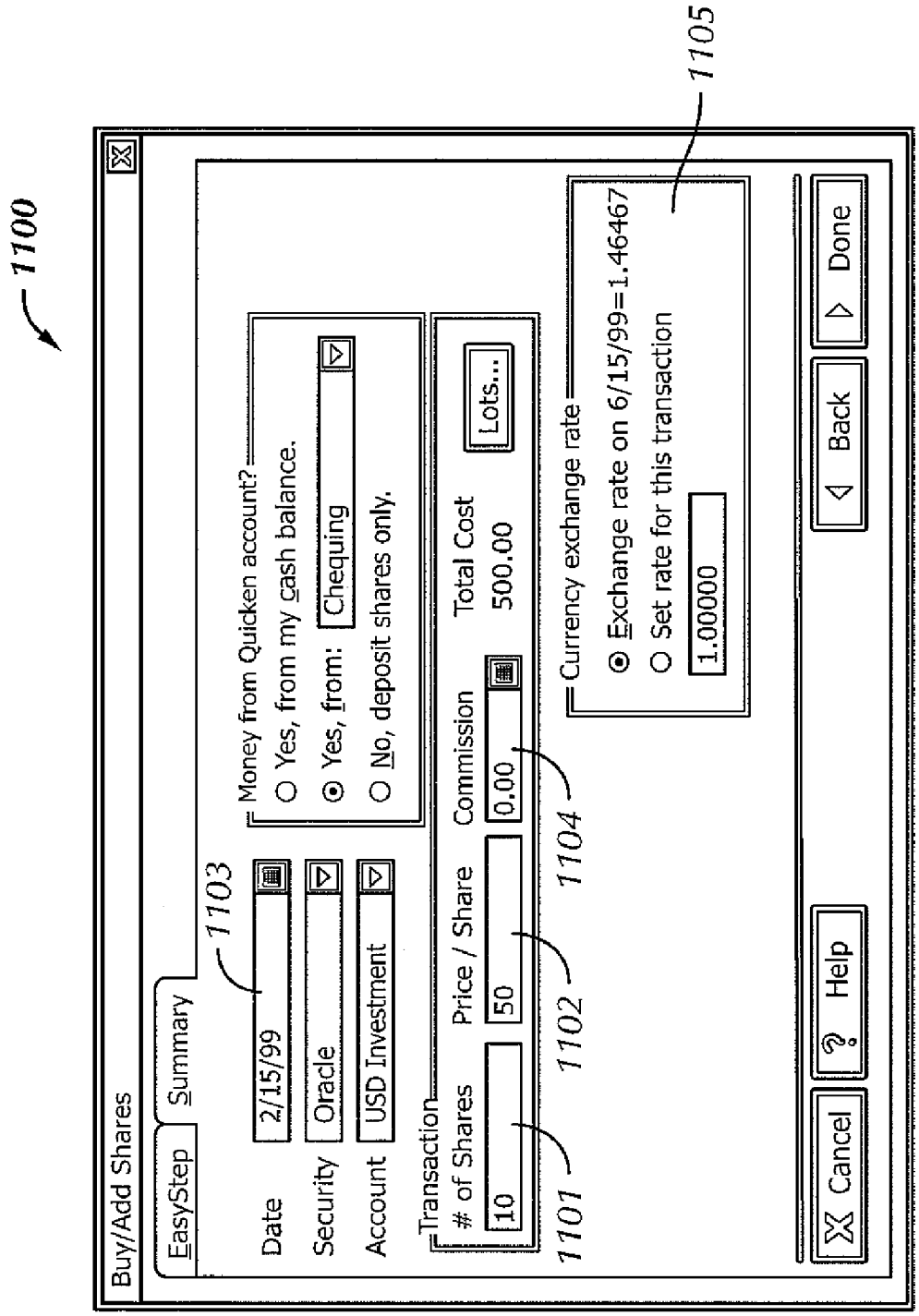
FIG. 11 is a diagram of an example of a Buy/Add Shares screen according to one embodiment of the present invention.

Referring now to FIG. 11, there is shown a Buy/Add Shares screen 1100, as displayed by user interface 106 according to one embodiment of the present invention. Screen 1100 is an example of a user interface for entering or editing transactions in a foreign currency. Screen 1100 shows the number of units (e.g. shares) 1101, the price per unit 1102, date of the transaction 1103, commission/fee 1104, and exchange rate 1105. The user can enter or edit any of the information in the various fields. Exchange rate 1105 is retrieved from history 102, if available. The user may override the exchange rate 1105 shown, and if appropriate, the new value may be written into history 102. Thus, in one embodiment historical exchange rate information is added to history 102 whenever a transaction is added for a date that does not already have an exchange rate stored in history 102.

Figure 12:
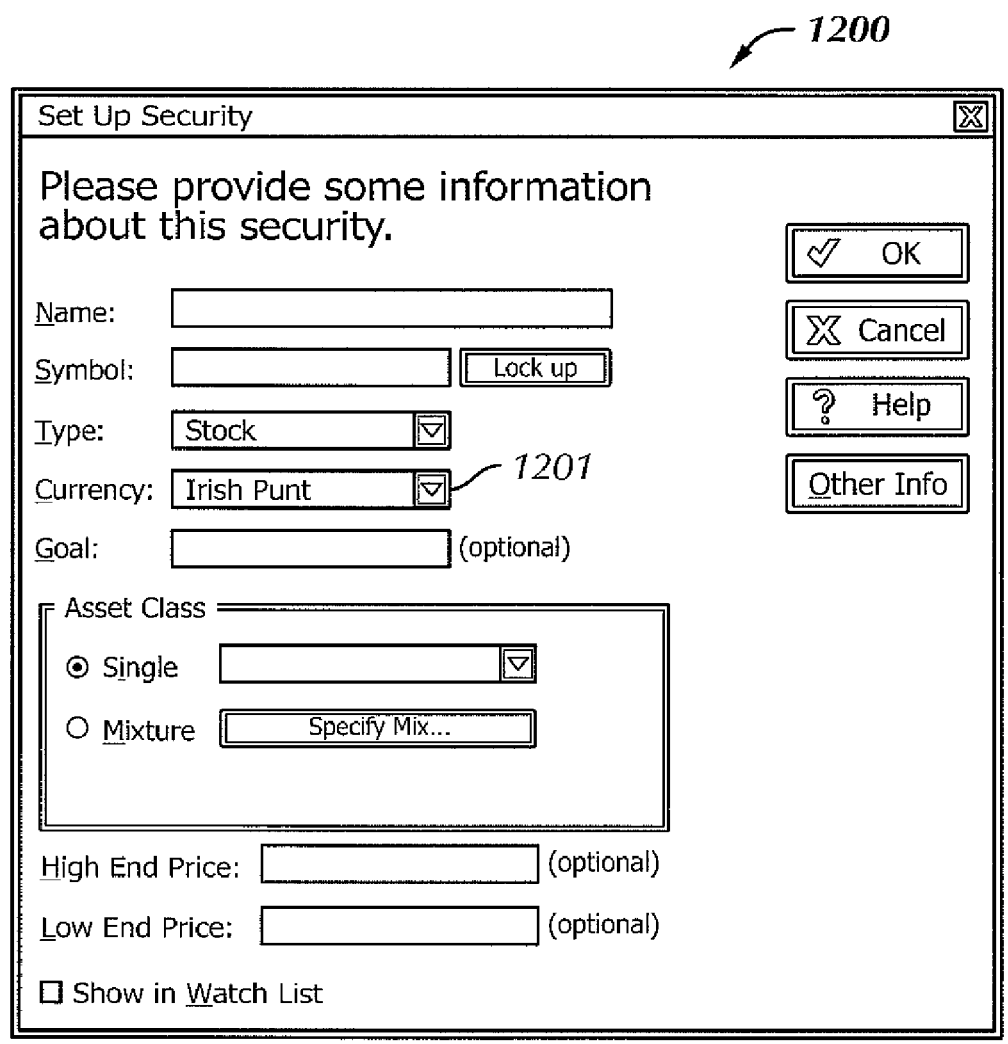
FIG. 12 is a diagram of an example of a Set Up Security screen according to one embodiment of the present invention.

Referring now to FIG. 12, there is shown a Set Up Security screen 1200, as displayed by user interface 106 according to one embodiment of the present invention. Screen 1200 is used to enter and/or edit general information about securities that are tracked in the investment register 1000. In addition to conventional fields, screen 1200 of the present invention includes a currency selection field 1201. In one embodiment, the user can select from a number of currencies using a drop-down menu, as shown. Once the selection has been made, the selected currency is associated with the security, and all transactions involving that security are recorded in the selected currency. In one embodiment, the user can select a currency using a predefined keyboard shortcut.

Figure 13:
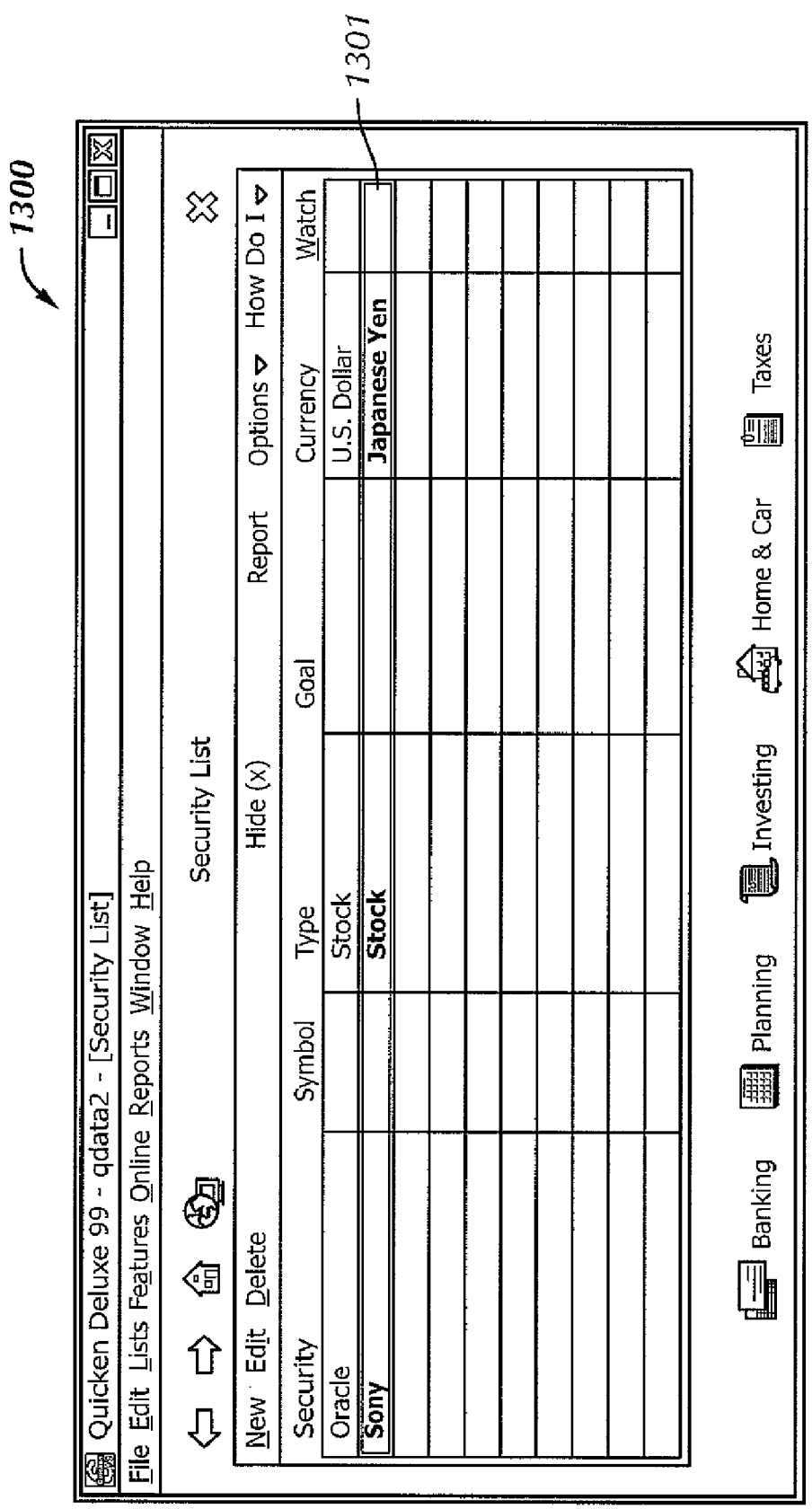
FIG. 13 is a diagram of an example of a Security List screen according to one embodiment of the present invention.

Referring now to FIG. 13, there is shown a Security List screen 1300, as displayed by user interface 106 according to one embodiment of the present invention. Securities are listed along with descriptive information. A currency 1301 for each security is also listed.

By tracking exchange rate information in the manner described above, the present invention is able to generate accurate reports for transactions involving foreign currencies, such as for example capital gains reports. Investment transactions show all transactions in the home currency (or any other currency selected by the user). For each transaction, the historical exchange rate in effect as of the transaction date is used to determine the home currency equivalent. In one embodiment, this exchange rate is retrieved from the transaction record where it was stored previously. In another embodiment, the system consults history 102 to obtain the exchange rate for the date of the transaction.

Figure 14:
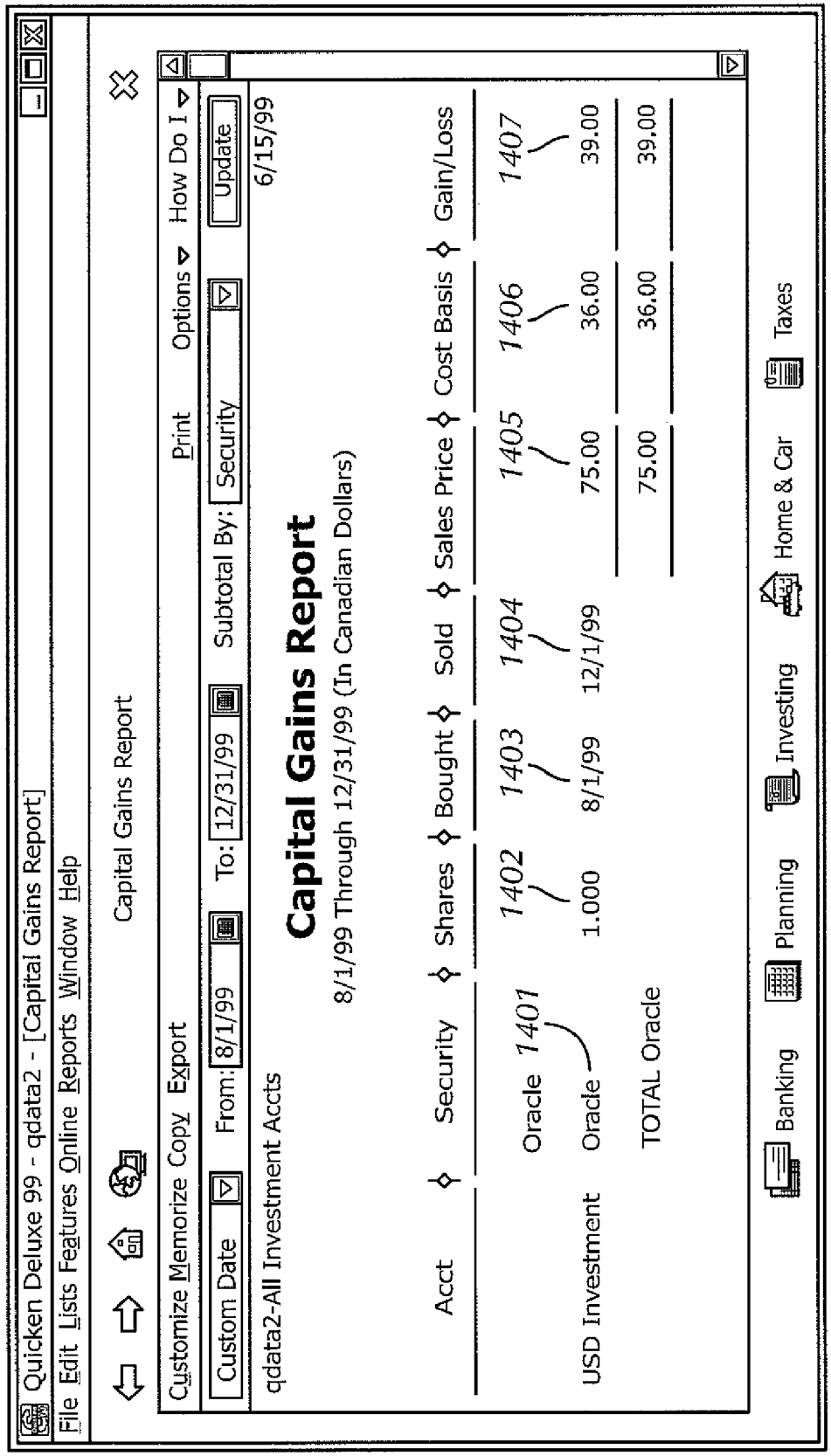
FIG. 14 is a diagram of an example of a Capital Gains Report according to one embodiment of the present invention.

For example, referring now to FIG. 14, there is shown a capital gains report 1400 generated using the present invention. As shown in the example, the present invention is able to generate a report that reflects historical exchange rates and thereby produces accurate gain/loss totals. Report 1400 reflects the following transactions (assuming the user's home currency is the Canadian dollar):

| Transaction | Foreign Currency | Exchange | Home Currency |
|---|---|---|---|
| Aug. 1, 1999: Buy 1 share at | $30.00 US | 1.2 | $36.00 CAD |
| Dec. 1, 1999: Sell 1 share at | $50.00 US | 1.5 | $75.00 CAD |
| Capital gain | | | $39.00 CAD |

The report shows name 1401 of the security, number of shares 1402, buy date 1403, sell date 1404, sales price 1405, cost basis 1406, and net gain/loss 1407. Sales price 1405 is based on the exchange rate in effect as of sell date 1404. Cost basis 1406 is based on the exchange rate in effect as of buy date 1403. Thus, net gain/loss 1407 is correctly generated using these historical exchange rates.

Purchase and sales prices for the relevant transactions is determined based on stored transaction information. When a number of securities or groups of securities are involved, selected transactions are matched with one another in accordance with recognized accounting principles, so as to determine which purchases correspond to which sales, for purposes of a report such as a Capital Gains Report.

In one embodiment, the user is able to select a currency for any report, so that all amounts shown in the report are converted to the selected currency. Historical exchange rate information can be used for the conversion, based on the date of each transaction in the report.

Balance reports, such as Net Worth and the like, are generated using exchange rates for a particular date (most commonly the present date). For each relevant amount in the report, the latest exchange rate in relation to the selected date is used. Other reports, including graphical reports, are similarly generated using historical exchange rate information. Such reports include, for example, Investment Performance, Investment Income, Capital Gains, Investment Transaction, and Securities Reports.

In one embodiment, the user is able to select whether historical exchange rate information will be used in generating a report. Referring now to FIG. 15, there is shown a Customize Capital Gains Report screen 1500 as displayed by user interface 106 according to one embodiment of the present invention. Among other customization options, screen 1500 provides field 1501 for selecting a currency for the report, as well as checkbox 1502 for selecting whether a transaction exchange rate (i.e. historical exchange rate) is to be used for the report. If the user checks box 1502, the report is generated as described above, using the appropriate exchange rate on each transaction that is included in the report. If the user elects not to check box 1502, the report is generated in a conventional manner using a single exchange rate.

From the above description, it will be apparent that the invention disclosed herein provides a novel and advantageous system and method of tracking multiple exchange rates for various transactions occurring over a period of time. By tracking historical exchange rates, the present invention is able to generate transaction reports that accurately display amounts in the user's home currency. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. In a computer-implemented system for managing financial transactions, a method for applying an exchange rate to convert a transaction from a first currency to a second currency, comprising:
   receiving, by a computer system, a financial transaction, including a date and a transaction amount in the first currency;
   accessing, by the computer system, an electronically stored plurality of historical exchange rates for the first currency with respect to the second currency, each historical exchange rate corresponding to a time period;
   if the date of the received financial transaction corresponds to a time period of one of the historical exchange rates, automatically selecting, by the computer system, the historical exchange rate;
   if the date of the received financial transaction does not correspond to a time period of one of the historical exchange rates, automatically selecting, by the computer system, a historical exchange rate having a most recent time period among available historical exchange rates having time periods prior to the date of the received financial transaction;
   automatically applying, by the computer system, the selected historical exchange rate to the received financial transaction, to derive a converted transaction amount in the second currency; and
   performing at least one of the steps of:
      storing the converted transaction amount in a storage medium; and
      outputting the converted transaction amount.

2. The method of claim 1, wherein each time period comprises one selected from the group consisting of:
   a date; and
   a range of dates.

3. The method of claim 1, further comprising:
   storing the received financial transaction including the date, the transaction amount, and the selected exchange rate.

4. The method of claim 1, further comprising:
   receiving input overriding the selected exchange rate, the input comprising a second exchange rate.

5. The method of claim 4, further comprising:
   storing, in the stored plurality of exchange rates, the second exchange rate and a corresponding time period for the second exchange rate.

6. The method of claim 1, wherein the financial transaction is a transfer between accounts.

7. The method of claim 1, wherein the financial transaction is selected from the group consisting of an investment purchase and an investment sale.

8. The method of claim 1, wherein outputting the converted transaction amount comprises:
   generating a report including the converted transaction amount; and
   outputting the generated report.

9. The method of claim 8, wherein the report is selected from the group consisting of:
   a capital gains report;
   a transaction report; and
   an investment report.

10. In a computer-implemented system for managing financial transactions, a method for applying exchange rates, comprising:
   receiving, by a computer system, a plurality of financial transactions, each financial transaction including a date and a transaction amount in a first currency;
   for each of at least a subset of the received financial transactions:
      if the date of the received financial transaction corresponds to a date of a stored historical exchange rate from an electronically stored plurality of historical exchange rates, automatically obtaining, by the computer system, the corresponding historical exchange rate;
      if the date of the received financial transaction does not correspond to a date of a stored historical exchange rate from an electronically stored plurality of historical exchange rates, automatically obtaining, by the computer system, a historical exchange rate having a most recent date among available historical exchange rates having dates prior to the date of the received financial transaction;
      automatically applying, by the computer system, the obtained historical exchange rate to the transaction to derive a transaction amount in a second currency;
      electronically storing, by the computer system, the derived transaction amount in the second currency; and
      electronically storing, by the computer system, the obtained historical exchange rate in an exchange rate table.

11. The method of claim 10, wherein at least one financial transaction is a transfer between accounts.

12. The method of claim 10, wherein at least one financial transaction is selected from the group consisting of an investment purchase and an investment sale.

13. The method of claim 10, further comprising:
   generating a report including the derived transaction amounts in the second currency.

14. The method of claim 13, wherein the report is selected from the group consisting of:
   a capital gains report;
   a transaction report; and
   an investment report.

15. A computer-implemented method for generating a financial report including at least two transactions, comprising:
   retrieving, by a computer system, a first transaction including a first date, a first transaction amount in a first currency, and a first historical exchange rate for the first currency, responsive to the first date;
   retrieving, by the computer system, a second transaction including a second date, a second transaction amount in a second currency, and a second historical exchange rate for the second currency, responsive to the second date;
   automatically applying, by the computer system, the first historical exchange rate to the first transaction to obtain a first converted amount in a home currency;
   automatically applying, by the computer system, the second historical exchange rate to the second transaction to obtain a second converted amount in the home currency; and
   outputting, by the computer system, a report including the converted amounts in the home currency;
   wherein each historical exchange rate corresponds to a time period, and wherein retrieving each historical exchange rate comprises:
      if the date of the transaction corresponds to a time period of one of the historical exchange rates, retrieving the historical exchange rate having a time period corresponding to the date of the transaction; and
      if the date of the transaction does not correspond to a time period of one of the historical exchange rates, retrieving the historical exchange rate having a most recent time period among available historical exchange rates having time periods prior to the date of the transaction.

16. The computer-implemented method of claim 15, wherein the first currency is the same as the second currency.

17. The computer-implemented method of claim 15, wherein each of the steps of obtaining a first exchange rate and obtaining a second exchange rate comprises retrieving an exchange rate from an exchange rate history table responsive to the date of the transaction.

18. The computer-implemented method of claim 15, wherein the report is selected from the group consisting of:
   a capital gains report;
   a transaction report; and
   an investment report.

19. A software product for managing financial transactions, comprising:
   an exchange rate table for storing a plurality of historical exchange rates for a currency, each historical exchange rate corresponding to a time period; and
   a user interface comprising a display of historical exchange rate information, the information comprising a plurality of exchange rates obtained from the exchange rate table; and
   an exchange rate code module for causing a computer system to perform the steps of:
      automatically selecting a historical exchange rate from the exchange rate table; and
      automatically applying the selected historical exchange rate to a transaction to obtain a converted transaction amount; and
      at least one of the steps of:
         storing the converted transaction amount in a storage medium; and
         outputting the converted transaction amount;
      wherein the transaction has a date, and wherein automatically selecting the historical exchange rate comprises:
         if the date of the transaction corresponds to a time period of one of the historical exchange rates, selecting the historical exchange rate having a time period corresponding to the date of the transaction; and
         if the date of the transaction does not correspond to a time period of one of the historical exchange rates, selecting the historical exchange rate having a most recent time period among available historical exchange rates having time periods prior to the date of the transaction.

20. The software product of claim 19, wherein the time period comprises one of:

a date; and a range of dates.

21. In a computer-implemented system for managing financial transactions, a user interface for applying exchange rates to financial transactions, comprising:

a first user interface element for receiving user entry of a financial transaction including a date; and a second user interface element for:

displaying, by a computer system, a default value for an exchange rate, the default value corresponding to one selected from the group consisting of:

a historical exchange rate having a time period corresponding to the date of the financial transaction; and a historical exchange rate having a time period that is most recent among available historical exchange rates having time periods prior to the date of the financial transaction; and receiving, by the computer system, at least one of user entry of and user selection of an exchange rate for the financial transaction.

22. A computer-implemented system for applying multiple exchange rates, comprising:

a list of currencies;

for each currency, a list of historical exchange rates, each exchange rate corresponding to a time period;

a transaction register, for storing transaction records, each of at least a subset of the transaction records;

a transaction input interface for receiving user entry of at least one transaction for storage in the transaction register, each transaction having a date; and an exchange rate selector for automatically selecting, for at least a subset of the entered transactions, an exchange rate from the list of historical exchange rates by:

if the date of the entered transaction corresponds to a time period of one of the historical exchange rates, selecting the historical exchange rate; and if the date of the entered transaction does not correspond to a time period of one of the historical exchange rates, selecting a historical exchange rate having a most recent time period among available historical exchange rates having time periods prior to the date of the entered transaction;

and wherein the transaction input interface displays the selected exchange rate;

and wherein the transaction register stores the selected exchange rate in the corresponding transaction record.

23. The computer-implemented system of claim 22, further comprising:

a report generator, coupled to the transaction register, for generating a report including at least one transaction record, the report including the exchange rate of the transaction record.

24. A computer-implemented system for applying multiple exchange rates, comprising:

an exchange rate storage device, for storing a plurality of historical exchange rates for converting a first currency to a second currency, each exchange rate corresponding to a time period;

a transaction storage device, for electronically storing at least one financial transaction in the first currency, including a date;

an exchange rate selector, coupled to the exchange rate storage device, for automatically selecting, for at least one stored financial transaction, an exchange rate from the plurality of historical exchange rates by:

if the date of the financial transaction corresponds to a time period of one of the stored historical exchange rates, selecting the historical exchange rate; and if the date of the financial transaction does not correspond to a time period of one of the stored historical exchange rates, selecting a historical exchange rate having a most recent time period among available stored historical exchange rates having time periods prior to the date of the financial transaction; and a transaction display, coupled to the transaction storage device and to the exchange rate selector, for automatically applying the selected stored exchange rate to the at least one stored financial transaction to obtain at least one value in the second currency, and for displaying the at least one value.

25. The computer-implemented system of claim 24, wherein the transaction storage device stores the financial transaction including the applied exchange rate.

26. The computer-implemented system of claim 24, further comprising:

a report generator, coupled to the transaction storage device, for generating a report including the financial transaction in the second currency.

27. A computer-implemented system for applying an exchange rate to convert a transaction from a first currency to a second currency, comprising:

an input device, for receiving at least one financial transaction, the financial transaction including a date and a transaction amount in a first currency;

an exchange rate retrieval device, for automatically selecting and obtaining an exchange rate for the received financial transaction, and for applying the exchange rate to convert the transaction amount to the second currency; and a transaction storage device, for storing the received at least one financial transaction including the date and at least one selected from the group consisting of the obtained exchange rate and the converted transaction amount;

wherein the exchange rate retrieval device selects the exchange rate from a plurality of stored historical exchange rates, each stored exchange rate having a time period, by:

if the date of the received financial transaction corresponds to a time period of one of the historical exchange rates, selecting the historical exchange rate;

if the date of the received financial transaction does not correspond to a time period of one of the historical exchange rates, selecting a historical exchange rate having a most recent time period among available historical exchange rates having time periods prior to the date of the received financial transaction.

28. The computer-implemented system of claim 27, further comprising:

an exchange rate table, coupled to the exchange rate retrieval device, for storing the obtained exchange rate and the date.

29. The computer-implemented system of claim 27, further comprising:

a report generator, coupled to the transaction storage device, for generating a report including the financial transaction.

30. A computer-implemented system for generating a financial report, including at least two transactions, comprising:

an exchange rate application device, for obtaining a first exchange rate for a first transaction, obtaining a second exchange rate for a second transaction, automatically applying the first exchange rate to the first transaction to obtain a first converted amount, and automatically applying the second exchange rate to the second transaction to obtain a second converted amount; and a report generation module, coupled to the exchange rate application device, for developing and formatting a report including the converted amounts; and an output device, coupled to the report generation module, for outputting the formatted report;

wherein the exchange rate application device obtains each exchange rate for each transaction from a plurality of stored historical exchange rates, each stored exchange rate having a time period, by:
- if the date of the transaction corresponds to a time period of one of the historical exchange rates, obtaining the historical exchange rate; and
- if the date of the transaction does not correspond to a time period of one of the historical exchange rates, obtaining a historical exchange rate having a most recent time period among available historical exchange rates having time periods prior to the date of the transaction.

31. The computer-implemented system of claim 30, further comprising:
a transaction storage device, for storing at least two financial transactions, and an associated exchange rate for each financial transaction.

32. A computer program product for applying an exchange rate to convert a transaction from a first currency to a second currency in a financial transaction management system, comprising:
a computer readable medium; and
computer program code, encoded on the medium, for controlling a processor to perform the operations of:
receiving a financial transaction, including a date and a transaction amount in the first currency;
accessing an electronically stored plurality of historical exchange rates for the first currency with respect to the second currency, each historical exchange rate corresponding to a time period;
if the date of the received financial transaction corresponds to a time period of one of the historical exchange rates, automatically selecting the historical exchange rate;
if the date of the received financial transaction does not correspond to a time period of one of the historical exchange rates, automatically selecting, by the computer system, a historical exchange rate having a most recent time period among available historical exchange rates having time periods prior to the date of the received financial transaction;
automatically applying the selected historical exchange rate to the received financial transaction, to derive a converted transaction amount in the second currency; and
performing at least one of the steps of:
storing the converted transaction amount in a storage medium; and
outputting the converted transaction amount.

33. The computer program product of claim 32, wherein each time period comprises one selected from the group consisting of:
a date; and
a range of dates.

34. The computer program product of claim 32, further comprising computer program code, encoded on the medium, for controlling a processor to perform the operation of:
storing the received financial transaction including the date, the transaction amount, and the selected exchange rate.

35. The computer program product of claim 32, further comprising computer program code, encoded on the medium, for controlling a processor to perform the operation of:
receiving input overriding the applied exchange rate, the input comprising a second exchange rate.

36. The computer program product of claim 35, further comprising computer program code, encoded on the medium, for controlling a processor to perform the operation of:
storing the second exchange rate and a corresponding time period in the stored plurality of exchange rates.

37. The computer program product of claim 32, wherein the financial transaction is a transfer between accounts.

38. The computer program product of claim 32, wherein the financial transaction is selected from the group consisting of an investment purchase and an investment sale.

39. The computer program product of claim 32, further comprising computer program code, encoded on the medium, for controlling a processor to perform the operations of:
generating a report including the converted transaction amount; and
outputting the generated report.

40. The computer program product of claim 39, wherein the report is selected from the group consisting of:
a capital gains report;
a transaction report; and
an investment report.

41. A computer program product for applying multiple exchange rates in a financial transaction management system, comprising:
a computer readable medium; and
computer program code, encoded on the medium, for controlling a processor to perform the operations of:
receiving a plurality of financial transactions, each financial transaction including a date and a transaction amount in a first currency; and
for each of at least a subset of the received financial transactions:
if the date of the received financial transaction corresponds to a date of a stored historical exchange rate from an electronically stored plurality of historical exchange rates, automatically obtaining the corresponding historical exchange rate;
if the date of the received financial transaction does not correspond to a date of a stored historical exchange rate from an electronically stored plurality of historical exchange rates, automatically obtaining a historical exchange rate having a most recent date among available historical exchange rates having dates prior to the date of the received financial transaction;
automatically applying the obtained historical exchange rate to the transaction to derive a transaction amount in a second currency;
automatically storing the derived transaction amount in the second currency; and
automatically storing the obtained historical exchange rate in an exchange rate table.

42. The computer program product of claim 41, wherein at least one financial transaction is a transfer between accounts.

43. The computer program product of claim 41, wherein the financial transaction is selected from the group consisting of an investment purchase and an investment sale.

44. The computer program product of claim 41, further comprising computer program code, encoded on the medium, for controlling a processor to perform the operation of:
generating a report including the derived transaction amounts in the second currency.

45. The method of claim 44, wherein the report is selected from the group consisting of:
a capital gains report;
a transaction report; and
an investment report.

46. A computer program product for generating a financial report including at least two transactions, comprising:
a computer readable medium; and
computer program code, encoded on the medium, for controlling a processor to perform the operations of:
retrieving a first transaction including a first date, a first transaction amount in a first currency, and a first historical exchange rate for the first currency, responsive to the first date;
retrieving a second transaction including a second date, a second transaction amount in a second currency, and a second historical exchange rate for the second currency, responsive to the second date;
automatically applying the first historical exchange rate to the first transaction to obtain a first converted amount in a home currency;
automatically applying the second historical exchange rate to the second transaction to obtain a second converted amount in the home currency; and
outputting a report including the converted amounts in the home currency;
wherein each operation of automatically applying a historical exchange rate to a transaction comprises:
if the date of the transaction corresponds to a date of a stored historical exchange rate from an electronically stored plurality of historical exchange rates, automatically applying the corresponding historical exchange rate;
if the date of the transaction does not correspond to a date of a stored historical exchange rate from an electronically stored plurality of historical exchange rates, automatically applying a historical exchange rate having a most recent date among available historical exchange rates having dates prior to the date of the transaction.

47. The computer program product of claim 46, wherein the first currency is the same as the second currency.

48. The computer program product of claim 46, wherein the report is selected from the group consisting of:
a capital gains report;
a transaction report; and
an investment report.

49. A computer program product for managing financial transactions, comprising:
a computer readable medium; and
computer program code, encoded on the medium, for controlling a processor to perform the operations of:
generating an exchange rate table for storing a plurality of historical exchange rates for a currency, each historical exchange rate corresponding to a time period; and
presenting a user interface comprising a display of historical exchange rate information, the information comprising a plurality of exchange rates obtained from the exchange rate table; and
automatically selecting a historical exchange rate from the exchange rate table;
automatically applying the selected historical exchange rate to a transaction; and
wherein the transaction has a date, and wherein automatically selecting the historical exchange rate comprises:
if the date of the transaction corresponds to a time period of one of the historical exchange rates, selecting the historical exchange rate having a time period corresponding to the date of the transaction; and
if the date of the transaction does not correspond to a time period of one of the historical exchange rates, selecting the historical exchange rate having a most recent time period among available historical exchange rates having time periods prior to the date of the transaction.

50. The software product of claim 49, wherein the time period comprises one of:
a date; and
a range of dates.

51. A computer program product for presenting a user interface for applying exchange rates to financial transactions, comprising:
a computer readable medium; and
computer program code, encoded on the medium, for controlling a processor to perform the operations of:
presenting a first user interface element for receiving user entry of a financial transaction including a date; and
presenting a second user interface element for:
displaying a default value for an exchange rate;
receiving at least one of user entry of and user selection of an exchange rate for the financial transaction;
wherein the default value for the exchange rate is determined by:
if the date of the financial transaction corresponds to a time period of a historical exchange rate from a stored plurality of historical exchange rates, retrieving the historical exchange rate having a time period corresponding to the date of the financial transaction; and
if the date of the financial transaction does not correspond to a time period of a historical exchange rate from the stored plurality of historical exchange rates, retrieving the historical exchange rate having a most recent time period among available historical exchange rates having time periods prior to the date of the financial transaction.

* * * * *

UNITED STATES PATENT AND TRADEMARK OFFICE
CERTIFICATE OF CORRECTION

PATENT NO. : 7,337,142 B1 Page 1 of 1
APPLICATION NO. : 09/428284
DATED : February 26, 2008
INVENTOR(S) : Andrew D. Holmes et al.

It is certified that error appears in the above-identified patent and that said Letters Patent is hereby corrected as shown below:

On the Cover Page

Item (73) Assignee, replace "Sun Microsystems, Inc., Santa Clara, CA (US)", with --Intuit Inc., Mountain View, CA (US)--.

Signed and Sealed this

Seventeenth Day of February, 2009

JOHN DOLL
*Acting Director of the United States Patent and Trademark Office*